US00RE36934E

United States Patent [19]

Arnaud

[11] E Patent Number: Re. 36,934

[45] Reissued Date of Patent: Oct. 31, 2000

[54] CONTROL DEVICE FOR A HANDS-FREE TELEPHONE SET

[75] Inventor: Thierry Arnaud, Toulouse, France

[73] Assignee: SGS-Thomson Microelectronics S.A., St. Genis, France

[21] Appl. No.: 08/010,957

[22] Filed: Jan. 29, 1993

Related U.S. Patent Documents

Reissue of:

[64] Patent No.: 4,989,242
Issued: Jan. 29, 1991
Appl. No.: 07/457,897
Filed: Dec. 27, 1989

U.S. Applications:

[63] Continuation-in-part of application No. 07/222,432, Jul. 19, 1988, Pat. No. 4,894,862.

[51] Int. Cl.[7] ..... H04M 1/60

[52] U.S. Cl. ..... 379/390; 379/388; 379/389; 370/288

[58] Field of Search ..... 379/390, 389, 379/388; 370/32.1

[56] References Cited

U.S. PATENT DOCUMENTS

| | | | |
|---|---|---|---|
| 3,925,618 | 12/1975 | Kato et al. | 379/389 |
| 3,952,166 | 4/1976 | Kato et al. | 379/390 |
| 4,484,034 | 11/1984 | Ferrieu et al. | 379/390 |
| 4,571,461 | 2/1986 | Uno et al. | 379/390 |
| 4,700,382 | 10/1987 | Means et al. | 379/390 |
| 4,741,018 | 4/1988 | Potratz et al. | 379/390 |
| 4,843,621 | 6/1989 | Potratz | 379/390 |
| 4,847,897 | 7/1989 | Means | 379/388 X |
| 4,879,745 | 11/1989 | Arbel | 379/89 |
| 4,894,862 | 1/1990 | Defretin et al. | 379/390 |
| 4,912,758 | 3/1990 | Arbel | 379/388 |

FOREIGN PATENT DOCUMENTS

| | | |
|---|---|---|
| 0271386 | 6/1988 | European Pat. Off. . |
| 87/10603 | 1/1989 | France . |
| 87/10604 | 1/1989 | France . |
| 59-230356 | 12/1984 | Japan . |

OTHER PUBLICATIONS

Gilbert, "A Precise Four–Quadrant Multiplier with Subnanosecond Response", IEEE Journal of Solid–State Circuits, vol. sc–3, No. –4 (Dec., 1968), pp. 365–373.

Armbruster, "High quality hands–free telephony using voice switching optimised with echo cancellation," II Proceedings of EUSIPCO–88. p. 495–8 (North–Holland, 1988).

Ferrieu et al., "A new principle to avoid undesirable oscillations in electroacoustic loops: application to the design of a hands free telephone set without voice switching," ICASSP 82.

Gilloire et al., "Achieving the control of the acoustic echo in audio terminals," II Proceedings of EUSIPCO–88 p. 491–4 (1988).

(List continued on next page.)

*Primary Examiner*—Krista Zele
*Assistant Examiner*—Jacques Saint-Surin
*Attorney, Agent, or Firm*—Theodore E. Galanthay; Lisa K. Jorgenson

[57] ABSTRACT

A control device for a hands-free telephone set automatically controls microphone and amplifier gains so that a feedback loop has less than unity gain to avoid circuit instability and resultant self-oscillation. An emission channel includes a microphone, a signal compressor and a controllable attenuator. A reception channel includes a signal compressor, an adjustable attenuator and a loudspeaker. The combination of the emission and reception channels form an amplification loop whereby the output of the reception channel is acoustically coupled to the input of the emission channel while the output of the emission channel is coupled to the input of the reception channel through a common telephone line. To avoid circuit oscillation, a circuit initially sets the gain of the loop to a predetermined value slightly less than unity (0 db) and subsequently maintains the loop gain constant by maintaining the sum of the compressor and attenuator gains at a fixed value.

25 Claims, 5 Drawing Sheets

OTHER PUBLICATIONS

Wilkowski et al., Echo cancelers enable full–duplex operation for hands–free mobile telephone, 36th IEEE Vehicular Technology Conference p. 430 (1986).

"Bidirectional intercom using two ICs," Electronique & Applications Industrielles No. 240 p. 102 Publication Date: Sep. 15, 1977.

Kato et al., "An analysis and design method of a voice switching circuit," Electronics and Communications in Japan vol. 56, No. 5 p. 38–46 (May 1973.

Dermardiros, "A CMOS Processor for a Hands–Free Telephone," 1985 ISSCC Digest pp. 184ff.

Furya et al., "Audio Conference Equipment with Acoustic Echo Canceller," NEC Journal of Research and Development No. 76, pp. 18–25, Jan. 1985.

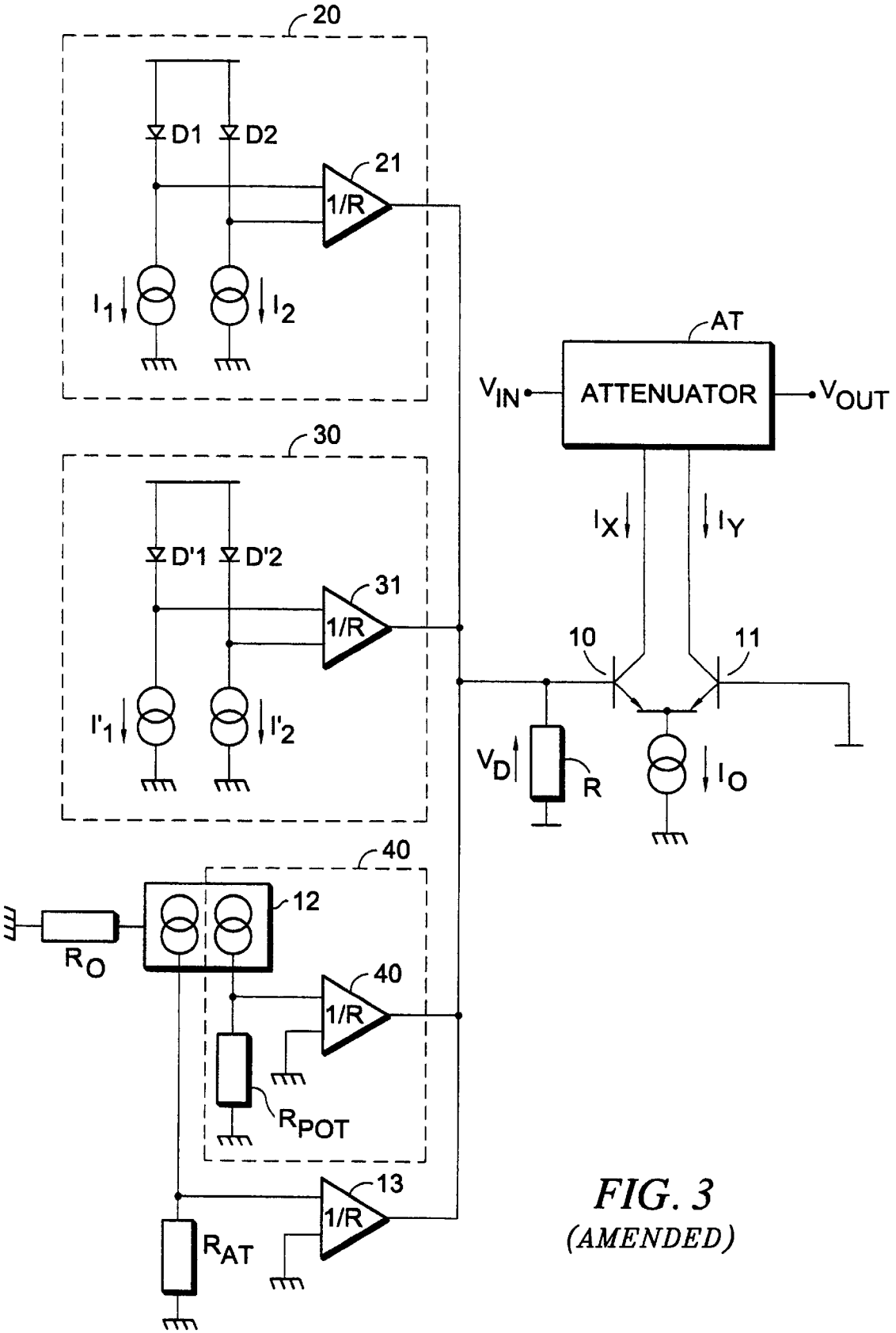
*FIG. 3*
*(AMENDED)*

CONTROL DEVICE FOR A HANDS-FREE TELEPHONE SET

Matter enclosed in heavy brackets [ ] appears in the original patent but forms no part of this reissue specification; matter printed in italics indicates the additions made by reissue.

*This application is a reissue application of Ser. No. 07/457,897, filed on Dec. 27, 1989, U.S. Pat. No. 4,989,242 which is a continuation of U.S. patent application Ser. No. 07/222,432, filed on Jul. 19, 1988, now U.S. Pat. No. 4,894,862.*

BACKGROUND OF THE INVENTION

The present invention generally relates to a control device for a hand-free telephone set. This device comprises an emission channel connected at one extremity to a microphone and at the other extremity to a telephone line interface and a reception channel connected at one extremity to the line interface and at the other extremity to a loudspeaker.

Such an apparatus comprises an amplifying loop constituted, on the one hand, by the two emission and reception channels and, on the other hand, by the loudspeaker/microphone acoustic coupling and by the electric coupling generated by the line interface which connects the emission and reception channels of each apparatus to the telephone line. If the gain of this amplifying loop is higher than one, an instability or Larsen effect occurs, which produces an unpleasant hiss.

In order to avoid this parasitic effect, an attenuator is generally disposed in each of the emission and reception channels.

An exemplary system, such as described for example in French patent application 87/10603 of July 21, 1987 is schematically shown in FIG. 1. The reception channel comprises a microphone R, an emission compressor GE, designed to supply at the output a compressed signal having a constant peak value, for example of about 100 millivolts, and an emission attenuator ATE, the output of which is connected to the telephone line L through a 2 wire/4 wire-type connection interface IL.

The reception channel similarly comprises a reception compressor GR and a reception attenuator ATR, the output of which is supplied to a loudspeaker HP. In order to avoid oscillations in the loop comprising the reception channel, the electric coupling AL between the line and the line interface, and the acoustic coupling AC between the loudspeaker and the microphone, each of the attenuators ATE and ATR is set to a minimum attenuation when the channel wherein it is positioned is active and to a maximum attenuation when the other channel is active. The system is said to be of the "alternate" type, that is, the talker cannot be interrupted by the party at the other end of the telephone line. In other words, it is not possible for those two parties to speak simultaneously since only one of the two channels of each telephone set is active, the emission channel of the talker and the reception channel of the listener.

The device described in the above-mentioned patent French application 87/10603 provides for an alternate control of the attenuators ATE and ATR by getting rid of the noise present in the microphone in the emission mode or in the line in the reception mode. Indeed, if the output signals of compressors GE and GR were compared for determining the operation of attenuators ATE and ATR, an important background noise in one of the channels (for example when one of the two parties speaks in a very noisy room) may generate a signal with an amplitude high enough at the output of the compressor for causing the attenuator of this channel to switch in active position (maximum attenuation). In such a case, there will always appear a maximum attenuation on the non-noisy channel and the other party could never be able to speak.

In order to avoid this drawback, the prior art device provides for detecting the peak value of the rectified signal at the output of each of the compressors GE and GR through peak detectors DE and DR. At the output of each of those peak detectors are provided circuits for detecting the noise signal, corresponding to integrators, IE and IR, respectively, having large time constants. Thus, it is possible to obtain at the input of a logic circuit CL information about the peak value of the signal on the emission channel (SE), the average value of the noise on the emission channel (SBE), the peak value of the signal on the reception channel (SR) and the average value of the noise on the reception channel (SBR). From those signals, the logic circuit CL supplies a first logic signal B/P indicating whether there is noise on both channels or whether someone is speaking on one of the channels, and a second logic signal E/R indicating, in case there is a speech signal, whether this speech signal has first appeared on the emission channel or on the reception channel. Those logic signals are supplied to a control circuit CC which, in presence of a speech logic signal on the output B/P, sets to low gain either emission or reception attenuator (ATE or ATR) corresponding to the channel on which a speech signal has been detected.

This prior art device supplies satisfactory results as regards selection of the active channel and elimination of noise signals, but still presents some drawbacks during switching from one channel to another. Indeed, in such a device, as in the case of all known devices, attenuators operate in one of the two states: a low or null predetermined attenuation state when the attenuator is in the active channel and in a predetermined maximum attenuation state when the attenuator is in the inactive channel, the transition between those two states[,] being ensured with a certain time constant. Moreover, some devices, such as the one of the above-mentioned patent application, provide for an intermediate attenuation position equal to half the maximum attenuation when none of the two channels is active, that is, when noise only is present on emission and reception channels.

The maximum attenuation of each of the attenuators being constant, said attenuation is to be chosen so as to be sufficient in the worst condition (that is, when the compressors have their maximum gain) and has therefore to be very high. As a result, during switching of the emission and reception channels, the transition is long if the switching time constants are chosen too high or causes an unpleasant parasitic effect for the listener.

Thus, an object of the invention is to palliate this drawback and reduce this adverse effect during switching without increasing the switching time constant of the system.

Another object of the invention is to further improve the logic circuit supplying the signals controlling the selection of attenuators.

BRIEF SUMMARY OF THE INVENTION

In order to achieve this object and others, the present invention provides for a device for controlling a hand-free telephone set, this device comprising, coupled to a telephone line interface:

an emission channel comprising a microphone, a signal compressor setting the microphone signal to a constant average level and an attenuator, and a reception channel comprising a signal compressor setting the line signal to a constant average level, an attenuator and a loudspeaker, the assembly of the emission and reception channels forming an amplifying loop, due to the acoustic coupling between microphone and loudspeaker and to the electric coupling in the line interface.

This control device comprises means or initially setting the gain of said loop to a determined value slightly lower than 1 (0 dB) and means for subsequently and automatically maintaining at a constant value, in operation, the sum of the compressor and attenuator gains.

Thus, according to the invention, the attenuation of the attenuator of the inactive channel is always maintained at a value high enough so that the amplifying loop of the emission and reception channels does not oscillate but is self-adapted to remain set close to this non-oscillating state so that, during switching, the gain variation of the attenuator has not to be as high as in the prior art.

BRIEF DISCLOSURE OF THE DRAWINGS

The foregoing and other objects, features and advantages of the invention will be apparent from the following detailed description of preferred embodiments as illustrated in the accompanying drawings wherein:

FIG. 1 schematically shows the main components of a hand-free telephone set according to the prior art;

FIG. 2 very schematically shows the amplifying loop of a hand-free device to explain the process implemented in the invention;

FIG. 3 shows an exemplary attenuator gain setting circuit;

DETAILED DESCRIPTION OF THE INVENTION

Figure 1:
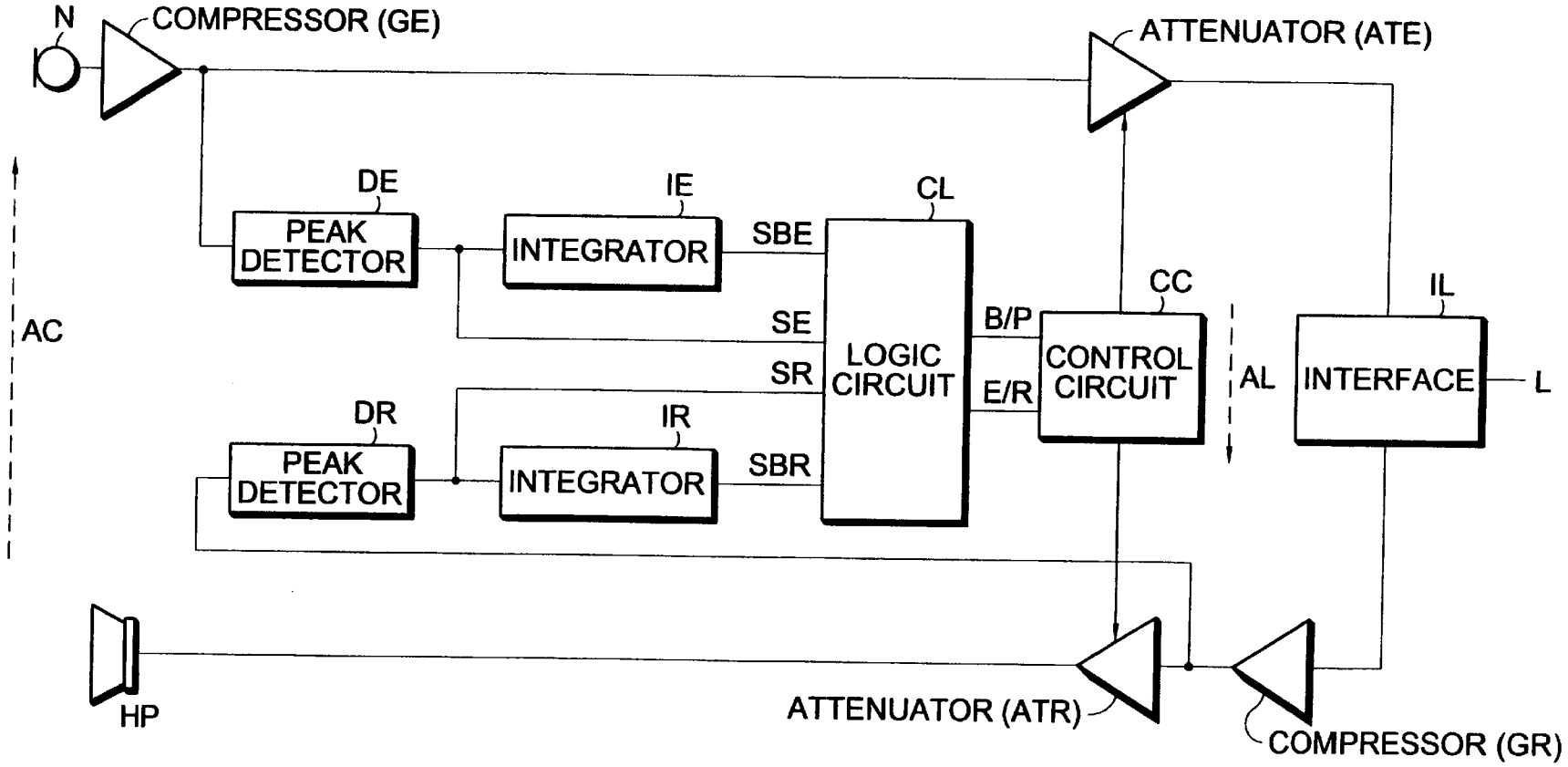
FIG. 1 PRIOR ART
Figure 2:
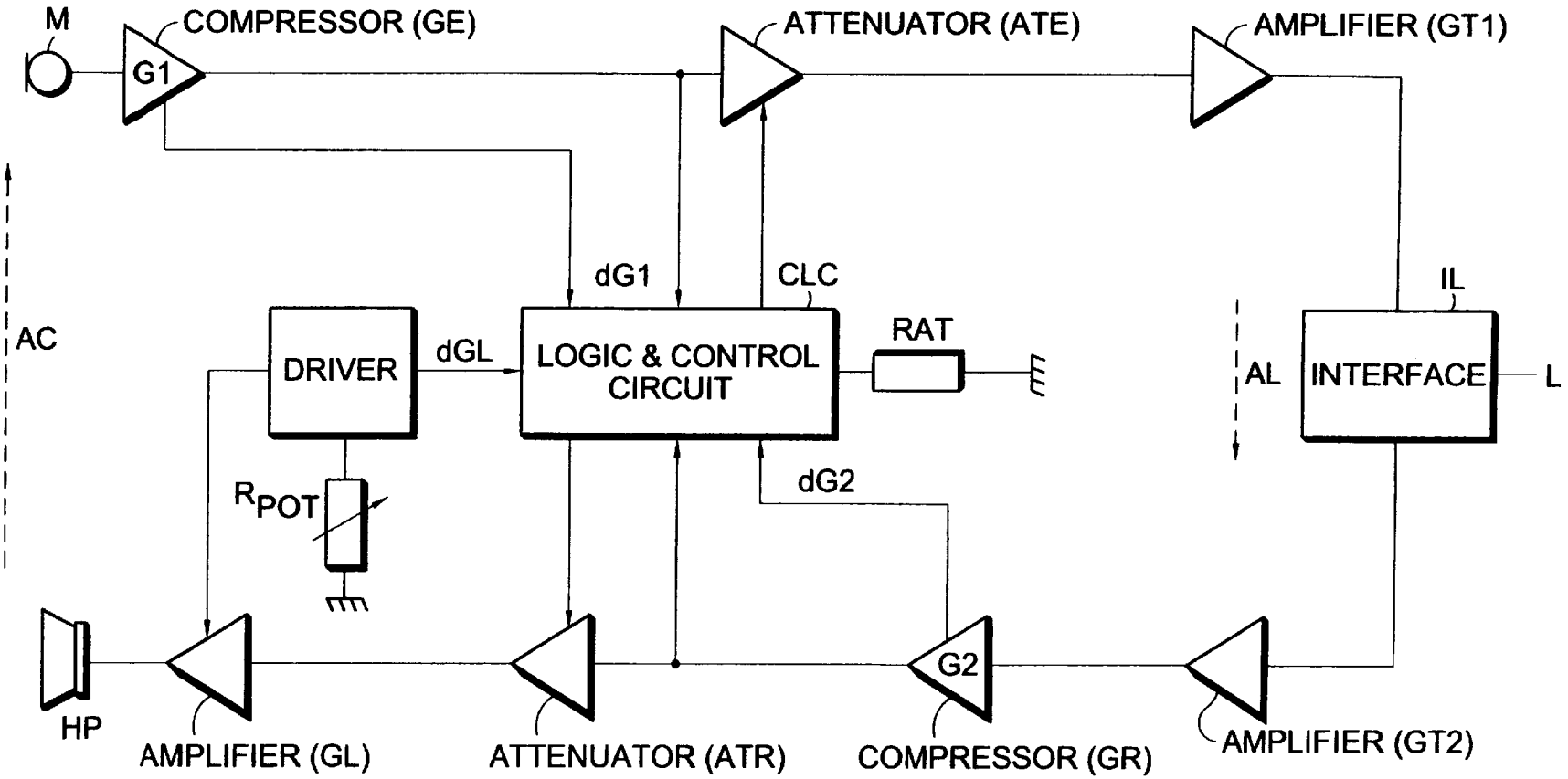

FIG. 2 shows the wiring diagram of a hand-free device in a slightly different way than in FIG. 1.

In the emission channel, a microphone M, a compressor GE and an attenuator ATE are again shown. Furthermore, the assembly of components presenting a gain included between the attenuator ATE and line L is shown in the form of an amplifier GT1. Similarly, the emission channel comprises a compressor GR, an attenuator ATR and a loudspeaker HP. Moreover, a loudspeaker amplifier GL usually used in such devices for allowing the user to set the sound intensity of the loudspeaker has been represented. Also, the sum of the gains between line L and compressor GR is drawn in the form of an amplifier GT2.

The electric coupling between the emission and reception channels in the line interface IL and the line L is characterized by an attenuation AL. Similarly, the acoustic coupling between the loudspeaker and the microphone is characterized by an attenuation AC. The gains and [atetnuations] *attenuations* GT1, GT2, AL and AC are considered as constant. However, as previously mentioned, compressors GE and Gr, the function of which is to control the amplitude of their output voltage at a predetermined peak value, have varying gains. At any time, the gain of those compressors can be defined as:

$$G1=G1_{min}+dG1 \text{ for the emission compressor GE, and}$$

$$G2=G2_{min}+dG2 \text{ for the reception compressor Gr}$$

dG1 and dG2 are the gain variations of the two compressors controlling the amplitude of the output signals at a fixed value. Lastly, the gain of the loudspeaker amplifier GL can be defined as $GL=GL_{max}-dGL$, $GL_{max}$ corresponding to the gain in case the loudspeaker is set to the highest sound intensity.

Thus, in case gains G1 and G2 are at their minimum values and loudspeaker HP is set to its maximum intensity, the gain of the amplifying loop will be:

$$G1_{min}+G2_{min}+GL_{max}+ATR+ATE+GT1+GT2+AL+AC \quad (1)$$

The sum of those gains (positive [an] *in* dB) and attenuations (negative in dB) has to supply a loop amplification lower than 1, that is, 0 dB. According to the invention, it is chosen to permanently maintain this sum to a constant value, for example −1 dB, by causing the sum ATR+ATE to vary in relation with the variations dG1, dG2 and -dGL. More particularly, of AO designates the value of the sum ATR+ATE resulting from *the conditions of* equation (1) hereinabove, a feedback on ATR and ATE is imposed [for having in each case] *to ensure that, under all conditions,*:

$$ATR+ATE=AO+dG1+dG2-dGL \quad (2)$$

Under those conditions, the circuit constantly optimizes the alternate operation by maintaining the loop gain as close to 0 dB as possible while avoiding instability conditions. The circuit thus automatically adapts itself to operating conditions.

To achieve this result, the invention provides for detecting the gain variations dG1 and dG2 of compressors GE and GR and the gain variation dGL of the loudspeaker amplifier and for applying, through a logic and control circuit labelled CLC in FIG. 2, the implementations of which will be described in more detail hereinafter, the gain variation:

$$dA=-(dG1+dG2-dGL)$$

to the attenuators. In practice, in an arrangement wherein one of the emission or reception channels is active, the corresponding attenuator will have a unit gain and the other attenuator will exhibit the attenuation AO+dA. In an arrangement wherein both channels are inactive, the two attenuators will be set to the same intermediate gain equal to (AO+dA)/2.

Some implementations of the various components of the hand-free device were already described in the above-mentioned French patent application 87/10603. Moreover, a preferred embodiment of the compressors was described in French patent application 87/10604 of July 21, 1987 *corresponding to U.S. application Ser. No. 222,432—now issued as U.S. Pat. No. 4,894,862.*

FIG. 3 shows an embodiment of the automatic setting of the gain of an attenuator AT (ATE or ATR). This attenuator is constituted by a two-quadrant multiplier such as described by B. Gilbert in the article "IEEE Solid State Circuits", Volume SC 3, pages 365–373, of December 1968. Such a circuit, represented by the block AT, has a gain which depends upon *the ratio of the* currents $I_x$ and $I_y$ which are extracted therefrom. Thus, if $V_{in}$ is the input voltage of this attenuator, its output voltage $V_{out}$ will be:

$$V_{out}=V_{in}(I_x/I_y),$$

that is, the gain is equal to $I_x/I_y$. Those currents $I_x$ and $I_y$ are set by a differential amplifier constituted for example by two NPN transistors 10 and 11, whose collectors are connected to block AT and emitters are interconnected to a current source 10. The base of transistor 10 is connected to a reference voltage through a resistor R and the base of transistor 11 is directly connected to the same reference voltage. Thus, if $V_D$ is the voltage across the terminals of resistor R:

$$I_x=I_O/(I+e^{V}D/^{V}T)$$

$$I_y=(I_O e^{V}d/^{V}T)/(1+e^{V}D/^{V}T)$$

and $$I_x/I_y=e^{-V}D/^{V}T$$

where $V_T$=kT/q (k: Boltzmann's constant, T: temperature in kelvins, q: charge of the electron - at room temperature $V_T$ is about 26 mV).

The basic setting of attenuator AT in conformity with equation (1), assuming the gain of the other attenuator is null, is set by resistors $R_O$ and $R_{AT}$ shown in the lefthand lower portion of FIG. 3. Resistor $R_O$ sets the current of a current source 12 to a value $V_T/R_O$. This current is injected into a resistor $R_{AT}$. The voltage across the terminals of resistor $R_{AT}$ is converted by a voltage-current converter 13 having a ratio 1/R and by resistor R on the base of NPN transistor 10 (the value of R being the same in both cases) into a voltage $V_D=(R_{AT}/R_O)V_T$. It will be noted that resistors $R_O$ and $R_{AT}$ are resistors external to the integrated circuit for permitting an initial setting in conformity with equation (1).

The other components shown on the lefthand portion of FIG. 3 permit [to modify] *modification of* the attenuation as a function of dG1, dG2 and of the setting of the loudspeaker amplifier.

Block 20 corresponds to the correction inherent in dG1, block 30 to the correction inherent in dG2 and block 40 to the correction inherent in the gain variation of the loudspeaker amplifier GL.

As conventional in the implementation of amplifiers and compressors in an integrated circuit and as can be seen more particularly in French patent application 87/10604, the compressor gain corresponds to the currents flowing through various current sources biasing each compressor. In order to have an indication on those gains or gain variations, it will therefore be sufficient to copy the currents flowing through those current sources by means of conventional current mirrors. For example, if the gain G1 of compressor GE depends upon the ratio of two currents $I_1$ and $I_2$ according to the formula:

$$G1=(I_1/I_2)G1_{min},$$

it will be possible to use a circuit such as the one of block 20 shown in FIG. 3, wherein the currents $I_1$ and $I_2$ flow through current sources corresponding to current mirrors, each of those current sources being in series with a diode, D1 and D2, respectively. The current drop in diode D1 fed by current $I_1$ will be:

$$V_{D1}=V_T\log(I_1/I_S)$$

where $V_T$=KT/q (k: Boltzmann's constant, T: temperature in kelvins, q: charge of the electron) and [is] $I_S$ *is* the saturation current of the diode. Similarly, the voltage drop $V_{D2}$ across the terminals of diode D2 will be:

$$V_{D2}=V_T\log(I_2/I_S)$$

The differential voltage $v_1=V_{D1}-V_{D2}$ will then be:

$$v_1=V_T\log(I_1/I_2).$$

Thus, an indication of the voltage corresponding to the gain variations of compressor GE is obtained.

This voltage difference is converted by a voltage-current converter 21 into a current $(V_T/R)\log(I_1/I_2)$ applied to the input resistor R of transistor 10 for contributing to voltage $V_D$ and therefore to the gain variation of attenuator AT.

Similarly, block 30 permits, as a function of currents $I'_1$ and $I'_2$ that are characteristic of the gain in the emission converter, to supply to the output of a voltage-current converter 31 an indication [on] *of* the gain variation of this compressor.

Lastly, block 40 permits to supply a signal indicating the gain variation of the microphone amplifier. The gain of this amplifier depends upon an external resistor $R_{POT}$. A current $V_T/R_O$ is injected into this resistor $R_{POT}$ from current source 12 and a current $(V_T/R)(-R_{POT}/R_O)$ is thereby obtained at the output of a voltage-current converter 41 having a value −1/R.

To summarize, when all the blocks 20, 30 and 40 are active, the voltage $V_D$ on resistor R at the input of transistor 10 is defined by:

$$[V_D=V_T[\log(I_1/I_2)+\log(I'_1/I'_2)+R_{AT}/R_O-R_{POT}/R_O]]\ V_D=V_T[log(I_1/I_2)+log(T_1/T_2)+R_{AT}/R_O-R_{POT}/R_O]$$

Since $I_x/I_y=e^{-V}D/^{V}T$, as previously seen, one obtains: $I_x/I_y=(I_2/I_1)\times(I'_2/IU'_1)\times e^{-R}AT^{/R}O\times e^{+R}POT^{R}O$. As a result, the object of the invention is achieved, namely the attenuation of attenuator AT will vary as a function of the gain variation of the emission and reception compressors and of the setting of the loudspeaker potentiometer.

Referring back to the prior art such as described in relation with FIG. 1, the object of the invention is also to improve the logic circuit CL permitting to process the information on signal+noise (SE, SR) and on noise (SBE, SBR) of the emission and reception channels for supplying the signal E/R determining the active channel (the circuit supplying the signal B/P still corresponds to what was described in the above-mentioned French patent application 87/10603).

Figure 4:
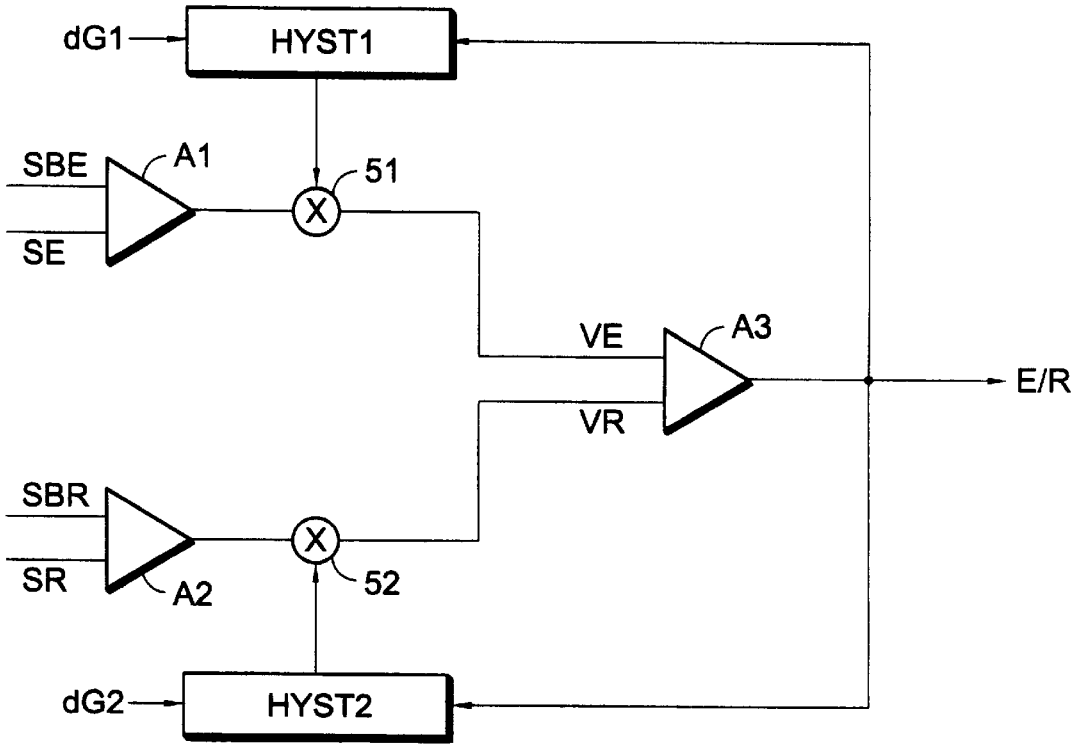
FIG. 4 is a block diagram of the noise/speech detection logic circuit with adaptive hysteresis of a device according to the invention.

FIG. 4 shows the general diagram of the active channel detection circuit (emission or reception) according to the invention. This circuit receives as inputs the signals SE, SBE, SR, SBR described in relation with FIG. 1. Signals SE and SBE are sent [are sent] onto a first subtractor A1 and signals SR and SBR onto a second substractor A2 so as to obtain at the output of each subtractor signals $V_E$=SE−SBE (noisefree emission signal) and $V_R$=SR−SBR (noisefree reception signal). Those signals are conventionally sent to a comparator A3 which supplies at the output a logic signal E/R indicating whether the active channel is the emission or reception channel.

According to the invention, an [adaptative] *adaptive* hysteresis is provided for at the active emission or reception input of amplifier A3. The aim of this hysteresis is to avoid spurious switching of the comparator which would cause a chopping of speech signals.

For this purpose, the output signal $V_E$ of subtractor A1 is multiplied in a multiplier 51 by a hysteresis coefficient HYST1 which depends upon the gain variation dG1 of the emission compressor GE. Similarly, the output of amplifier A2 is multiplied in a multiplier 52 by a hysteresis coefficient HYST2 which depends upon the gain variation dG2 of the reception compressor GR. Blocks HYST1 and HYST2 are enabled by the output E/R of amplifier A3 so that the hysteresis is applied to the channel that is determined as being inactive.

Indeed, if, at the initial stage, while no hysteresis is applied, a signal in the emission channel is detected, it may happen in certain cases, if the coupling quality of the telephone line AL is very poor, that signals occur at the output of compressor GR, the amplitude of which is higher than that of signals from compressor GE (signals of GR are then outside the compression area). The aim of the hysteresis is to take this factor into account and to provide proper information in order that, as long as the emission channel is active, $V_E$ remains higher than $V_R$, therefore preventing signal E/R from switching.

Thus, assuming for the sake of simplicity that the noise is null (SBR=SBE=0), the voltage VR resulting from the coupling AL is:

$$V_R=V_E\times ATE\times AL\times GT1\times GT2\times G2\times HYST2.$$

HYST2 is chosen so that $V_R$ is lower than $V_E$, which causes comparator A3 to continue supplying the emission information (E) as long as signal $V_E$ has not disappeared (end of speech).

For the initial setting of this circuit, in the emission mode, one considers the case where $G2=G2_{min}$ and calculates the hysteresis $HYST2_O$ to be introduced for having $V_R$ lower than $V_E$. The circuit is set for this case and, then, as will be seen later on, an automatic adaptation of the hysteresis value is provided for in order that if the gain of compressor GR becomes $G2_{min}$+dG2, VR<VE is maintained. The foregoing is similarly applied for the reception mode.

Figure 5:
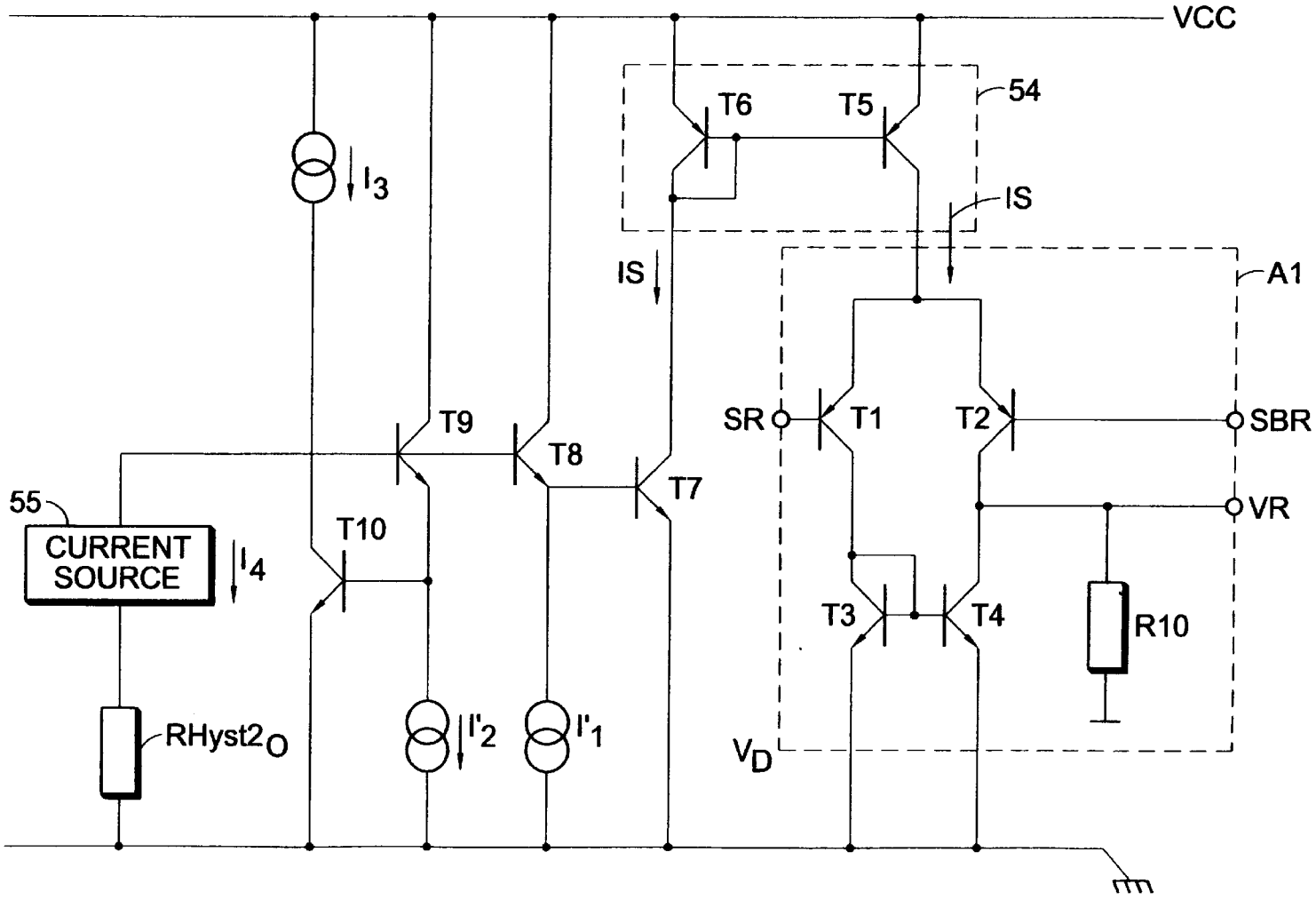
FIG. 5 shows exemplary implementation of a portion of the circuits of FIG. 4.

An exemplary circuit permitting to obtain this result is illustrated in FIG. 5 for the reception channel.

FIG. 5 shows comparator A1 receiving signals SR and SBR and supplying a voltage $V_R$ to amplifier A3 (not shown). This comparator conventionally comprises a differential circuit constituted by two PNP transistors T1 and T2 loaded by an active load constituted by two common base NPN-type transistors T3 and T4. The collector of transistor T3 is connected to the collector of transistor T1, the collector of transistor T4 being connected to the collector of transistor T2 and the emitters of transistors T3, T4 being grounded. Moreover, the bases of transistors T3 and T4 are connected to the collector of transistor T3. The output voltage is collected across the terminals of a resistor R10 connected between the collectors of transistors T2 and T4 and a reference voltage. This is a conventional comparator arrangement wherein the emitters of transistors T1 and T2 have to be fed by a current $I_S$.

According to the invention, current $I_S$ is set so as to take into account a hysteresis value at rest and to vary if the gain of compressor GR varies. Thus, current $I_S$ is obtained through a current mirror 54 wherein a PNP transistor T5 copies the current in a PNP transistor T6. The current in this transistor T6 depends upon the biasing of an NPN transistor T7[,]. Transistors T6 and T7 are serially connected between the supply voltage $V_{CC}$ and the ground.

The biasing circuit of transistor T7 comprises two transistors T8 and T9 connected between voltage $V_{CC}$ and the ground through current sources $I'_1$ and $I'_2$, currents $I'_1$ and $I'_2$ being such as previously indicated, namely $G2=G2_{min}(I'_1/I'_2)$. The bases of transistors T8 and T9 are interconnected. The connection point of those bases is connected to the supply voltage $V_{CC}$ through a current source $I_3$ and to the ground through a transistor T10, the base of which is connected to the emitter of transistor T9. The common base of transistors T8 and T9 is furthermore grounded through a current source 55 supplying a current $I_4=V_T/R_{HYST20}$ in relation with a resistor $R_{HYST20}$, external to the integrated circuit and chosen for the hereinabove-mentioned initial setting.

For calculating the value of $I_S$ in the circuit of FIG. 5, it can be written that the base voltages of transistors T8 and T9 are identical (those bases are interconnected). The base voltage of transistor T9 is equal to the base-emitter voltage of this transistor plus the base-emitter voltage of transistor 10 and the base voltage of transistor 8 is equal to the base-emitter voltage of this transistor plus the base-emitter voltage of transistor T7, that is:

$$VBE_{T9}+VBE_{T10}=VBE_{T8}+VBE_{T7}.$$

Current in transistor T10 is substantially equal to $I_3-I_4$, the current in transistor T9 is equal to $I'_2$, the current in transistor T8 is equal to $I'_1$ and the current in transistor T7 is the current $I_S$ that it is desired to obtain.

Thus, by using the fact that the base-emitter voltage of an NPN transistor is proportional to the logarithm of the current that flows therethrough, one obtains:

$$I_S=(I'_2/I'_1)(I_3-I_4).$$

Current $I_3$ has a predetermined value and current I4 depends upon the value of resistor $R_{HYST2}$. Thus, when the gain of compressor GR is at its minimum value $GR_{min}$, $I'_1=I'_2$ and current $I_S$ only depends upon the value $R_{HYST2O}$. Then, when gain G2 varies, current $I_S$ reciprocally and proportionally varies as a function of this gain since $$G_2=G2_{min}(I'_1/I'_2).$$

Thus, with the circuit illustrated in FIG. 5 a multiplier-subtractor has been achieved, permitting to carry out a noise elimination by a subtraction followed by a multiplication by the reciprocal value of the compressor gain of the considered channel, this multiplication being carried out so that the inactive channel is not erroneously processed due to a signal resulting from coupling with the active channel.

Thus, such circuit constantly adapts the hysteresis parameter to operation [A3. The] conditions so as to optimize the result of comparator A3. The operation is the same for hysteresis HYST1 to be applied to the other input of comparator A3 when the reception channel is active.

I claim:

1. A hands-free telephone set connectable to a telephone line for receiving a distant audio signal transmitted on said telephone line to said hands-free telephone set and transmitting a local audio signal to said telephone line, said hands-free telephone set comprising:

an emission channel for receiving, at a sound sensor thereof, an acoustic signal, converting said acoustic signal to a corresponding electrical audio signal, and transmitting from an output said audio signal onto said telephone line, said emission channel including a microphone for detecting said acoustic signal and converting said acoustic signal to a corresponding electrical local audio signal, an emission compressor having a first controllable gain and receiving said local audio signal and controlling a level of said local audio signal to a constant average level to supply a compressed local audio signal, and an attenuator receiving said compressed local audio signal and, in response to a first gain control signal, controlling a level of said compressed local audio signal to supply a level controlled compressed local audio signal to said telephone line, and a reception channel for receiving at an input thereof said distant audio signal from said telephone line and providing at an output transducer an acoustic output, said reception signal channel including a reception compressor having a second controllable gain receiving said distant audio signal from said telephone line and setting a level of said received distant audio signal to a constant average level to generate a compressed distant audio signal, a second attenuator receiving said compressed distant audio signal and, in response to a second gain control signal, controlling a level of said compressed distant audio signal to generate a level controlled compressed distant audio signal, and a loudspeaker receiving said level controlled compressed distant audio signal and, in response, generating an acoustic output signal, said emission and reception channels forming an amplifying loop by an acoustic coupling provided between the microphone and loudspeaker in combination with an electric coupling formed between said emission and reception channels formed at said telephone line;

means for initially setting a gain of said loop to a predetermined value less than unity (0 db), and gain controlling means for computing a sum of, and substantially maintaining constant a sum of the compressor gains and attenuator gains.

2. A device according to claim 1, further comprising means for detecting gain variations of the emission and reception compressors and, in response, controlling the attenuation of at least one of the attenuators.

3. A device according to claim 1 wherein the loudspeaker is associated with a gain-controlled amplifier and wherein said gain controlling means compute, and maintain constant, a sum of the gains of the compressors, attenuators and loudspeaker amplifiers.

4. A control device for a hands-free telephone set according to claim 1 comprising means for selecting one of said emission and reception channels as an active channel and the other of said channels as an inactive channel in response to a comparison of an output of the emission compressor with an output of the reception compressor performed by comparing means; and multiplying means for multiplying a comparison input corresponding to the inactive channel by a hysteresis coefficient reciprocally proportional to a compressor gain of this inactive channel.

5. A control device for a hands-free telephone set according to claim 4 wherein the multiplying means comprises a differential amplifier performing, for the inactive channel, a subtraction between the signal affected with noise and the noise of this channel, said comparator being fed by a current proportionally varying as a function of an external resistor and reciprocally with respect to the compressor gain of said inactive channel.

6. A control device for a hands-free telephone set according to claim 5 wherein said current is supplied by a circuit comprising, between a supply voltage and the ground:

a first NPN transistor, a second NPN transistor in series with a first current source, a third NPN transistor in series with a second current source, a fourth NPN transistor in series with a third current source, the base of the first transistor being connected to the emitter of the second one; the bases of the first and second transistors being interconnected and connected to the collector of the fourth transistor, the base of which is connected to the emitter of the third one; a fourth current source proportional to the value of a resistor being connected to the terminals of the fourth transistor for supplying a reciprocally proportional current varying as a function of the value of said resistor; the current of said second and third current sources being such that their ratio is proportional to the compressor gain of a respective one of said reception and emission channels.

*7. A telephone set device, comprising:*

*a connection for a microphone;*

*a connection for a loudspeaker;*

*at least one bidirectional interface for audio signals;*

*said interface being operatively connected to receive audio signals from said microphone connection through a first compression stage connected to reduce the dynamic range of signals received at said microphone connection, and a first amplification/attenuation stage;*

*said loudspeaker connection being operatively connected to receive audio signals to said interface through a second compression stage connected to reduce the dynamic range of signals received at said interface, and a second amplification/attenuation stage;*

*control circuitry connected and configured to regulate the gain of said first and second amplification/attenuation stages so that a total loop gain, including acoustic coupling from said loudspeaker connection to said microphone connection, and including net gain/loss through said bidirectional interface, remains at a substantially constant predetermined negative figure.*

*8. The telephone set device of claim 7, wherein said substantially constant predetermined figure corresponds to approximately −1 dB total loop gain.*

*9. The telephone set device of claim 7, wherein said substantially constant predetermined figure is slightly lower than 0 dB total loop gain.*

*10. The telephone set device of claim 7, further comprising an adaptive hysteresis circuit which imposes hysteresis, on switching attenuation between said first and second amplification/attenuation stages, in accordance with varying compression values of said compression stages.*

*11. The telephone set device of claim 7, wherein each said amplification/attenuation stage includes amplification elements and also a controllable attenuator.*

*12. The telephone set device of claim 7, wherein each respective said compression stage comprises an amplifier*

*which is connected to operate at a variable gain in a feedback relation which maintains a substantially constant output at the output of each respective said compression stage.*

*13. A telephone set device, comprising:*

*connections for a microphone and for a loudspeaker;*

*at least one bidirectional interface for audio signals;*

*said interface being operatively connected to receive audio signals from said microphone connection through a first compression stage connected to reduce the dynamic range of signals received at said microphone connection, and a first amplification/attenuation stage;*

*said loudspeaker connection being operatively connected to receive audio signals from said interface through a second compression stage connected to reduce the dynamic range of signals received at said interface, and a second amplification/attenuation stage;*

*control circuitry connected and configured to detect the presence of a speech signal and accordingly to switch the respective attenuations of said amplification/attenuation stages, and to regulate the gain of said first and second amplification/attenuation stages so that a total loop gain, including coupling from said loudspeaker connection to said microphone connection, and including net gain/loss through said bidirectional interface, remains at a substantially constant predetermined figure;*

*wherein said control circuit switches said respective attenuations in a control relationship having hysteresis which is dynamically dependent on varying compression values of said compression stages.*

*14. The telephone set device of claim 13, wherein said substantially constant predetermined figure corresponds to approximately −1 dB total loop gain.*

*15. The telephone set device of claim 13, wherein said substantially constant predetermined figure corresponds to approximately 0 dB total loop gain.*

*16. The telephone set device of claim 13, further comprising an adaptive hysteresis circuit which imposes hysteresis, on switching attenuation between said first and second amplification/attenuation, stages in accordance with varying compression values of said compression stages.*

*17. The telephone set device of claim 13, wherein each said amplification/attenuation stage includes amplification elements and also a controllable attenuator.*

*18. The telephone set device of claim 13, wherein each respective said compression stage comprises an amplifier which is connected to operate at a variable gain in a feedback relation which maintains a substantially constant output at the output of each respective said compression stage.*

*19. A telephone set device, comprising:*

*connections for a microphone;*

*connections for a loudspeaker, and at least one amplifier operatively connected to drive said loudspeaker;*

*at least one bidirectional interface for audio signals;*

*said interface being operatively connected to receive audio signals from said microphone connection through a first compression stage connected to reduce the dynamic range of signals received at said microphone connection, and a first amplification/attenuation stage;*

*said loudspeaker connection being operatively connected to receive audio signals from said interface through a second compression stage connected to reduce the dynamic range of signals received at said interface, and a second amplification/attenuation stage;*

*control circuitry connected and configured to sense the value of compression in said first and second compression stages, and the value of amplification in said loudspeaker amplifier, and a speech and background noise level of signals received from said microphone and said interface, and to regulate the gain of said first and second amplification/attenuation stages*

*so that, when the presence of a speech signal is detected, the one of said amplification/attenuation stages passing said speech signal is less attenuated than the other of said amplification/attenuation stages, and*

*so that a total loop gain, including coupling from said loudspeaker connection to said microphone connection, and including net gain/loss through said bidirectional interface, remains at a substantially constant predetermined figure which is close to, but less than, 0 dB.*

*20. The telephone set device of claim 19, wherein each respective said compression stage comprises an amplifier which is connected to operate at a variable gain in a feedback relation which maintains a substantially constant output at the output of each respective said compression stage.*

*21. The telephone set device of claim 19, wherein said substantially constant predetermined figure corresponds to approximately −1 dB total loop gain.*

*22. The telephone set device of claim 19, wherein said substantially constant predetermined figure corresponds to approximately 0 dB total loop gain.*

*23. The telephone set device of claim 19, further comprising an adaptive hysteresis circuit which imposes hysteresis, on switching attenuation between said first and second amplification/attenuation stages, in accordance with varying compression values of said compression stages.*

*24. The telephone set device of claim 19, wherein each said amplification/attenuation stage includes amplification elements and also a controllable attenuator.*

*25. A method for operating a hands-free telephone set control device which controls amplification/attenuation values in both emission and reception channels, which together form an amplifying loop, comprising the steps of:*

*a) initially setting the gain of said amplifying loop to a predetermined value slightly less than unity (0 db);*

*b) dynamically compressing signals in said emission and said reception channels to a substantially constant peak value;*

*c) sensing comparative noise-free signals in both channels, and accordingly changing programmable amplification/attenuation values in both said channels to minimize attenuation of speech signals, while also controlling said amplification/attenuation values so that the total loop gain, including the sum of a compression gain and said amplification/attenuation values and acoustic couplings, from said amplification/attenuation values and acoustic couplings, from said loudspeaker connection to said microphone connection, remains at said predetermined value.*

* * * * *